US00RE36869E

United States Patent [19]

Ewen

[11] E Patent Number: Re. 36,869

[45] Reissued Date of Patent: Sep. 12, 2000

[54] POST-MASTECTOMY GARMENT

[76] Inventor: Carol J. Ewen, 1104 S. McDougal Rd., Mahomet, Ill. 61853

[21] Appl. No.: 08/556,793

[22] Filed: Nov. 2, 1995

Related U.S. Patent Documents

Reissue of:

[64] Patent No.: 5,257,956
Issued: Nov. 2, 1993
Appl. No.: 07/869,549
Filed: Apr. 14, 1992

[51] Int. Cl.[7] ..... A41C 3/00; A41D 13/00

[52] U.S. Cl. ..... 450/1; 2/102; 2/108; 2/114; 2/DIG. 7; 450/58; 602/13; 602/62; 602/63

[58] Field of Search ..... 2/2, 2.5, 22, 23, 2/24, 16, 48, 44, 49.1, 49.2, 49.3, 49.4, 49.5, 69, 73, 69.5, 102, 92, 105, 106, 107, 108, 113, 114, 115, 267, 268, 913, 914, 915, 916; 450/1, 30, 31, 32, 53, 54, 55, 56, 57, 58, 70; 602/4, 13, 62, 63

[56] References Cited

U.S. PATENT DOCUMENTS

| | | | |
|---|---|---|---|
| 1,075,010 | 10/1913 | Casebolt | 2/126 |
| 1,155,544 | 10/1915 | Bonoff | 2/114 |
| 1,786,105 | 12/1930 | Clark | 2/106 X |
| 2,069,643 | 2/1937 | Burke | 128/165 |
| 2,259,617 | 10/1941 | Clermont | 450/58 X |
| 2,847,002 | 8/1958 | Doumar | 602/4 |
| 3,116,491 | 1/1964 | Previdi et al. | 2/114 X |
| 3,173,420 | 3/1965 | Mazzoni et al. | 450/54 |
| 3,348,421 | 10/1967 | Boice | 74/202 |
| 3,561,442 | 2/1971 | Goswitz | 128/157 |
| 3,701,168 | 10/1972 | Balow | 3/36 |
| 3,811,434 | 5/1974 | Jacobson et al. | 602/13 |
| 3,950,792 | 4/1976 | Williams | 3/36 |
| 3,968,803 | 7/1976 | Hyman | 128/482 |
| 4,182,320 | 1/1980 | Sweeney | 602/13 |
| 4,300,542 | 11/1981 | Baron | 602/13 |
| 4,375,805 | 3/1983 | Weber | 126/417 |
| 4,375,809 | 3/1983 | Meals | 128/90 |
| 4,412,542 | 11/1983 | Reichert | 128/455 |
| 4,469,095 | 9/1984 | Herrera | 128/65 |
| 4,538,614 | 9/1985 | Henderson | 450/70 |
| 4,570,268 | 2/1986 | Freeman | 2/114 |
| 4,602,385 | 7/1986 | Warren | 2/2.5 X |
| 4,637,076 | 1/1987 | Tartt et al. | 2/102 |
| 4,698,848 | 10/1987 | Buckley | 2/114 |
| 4,718,124 | 1/1988 | Sawicki et al. | 2/114 |
| 4,774,724 | 10/1988 | Sacks | 2/2.5 |
| 4,781,650 | 11/1988 | Budd | 450/55 |
| 4,788,972 | 12/1988 | DeBusk | 128/89 R |
| 4,816,005 | 3/1989 | Braaten | 450/74 X |
| 4,847,913 | 7/1989 | Chen | 2/2.5 X |
| 4,854,915 | 8/1989 | Luedy | 450/31 |
| 4,891,846 | 1/1990 | Sager et al. | 2/102 X |
| 4,971,041 | 11/1990 | Millikan et al. | 128/87 R |
| 4,977,622 | 12/1990 | Schley | 2/114 X |
| 5,023,953 | 6/1991 | Bettcher | 2/126 |
| 5,037,348 | 8/1991 | Farino | 450/70 X |
| 5,048,122 | 9/1991 | Prieur | 2/69 |
| 5,060,641 | 10/1991 | Jones | 602/13 |
| 5,073,985 | 12/1991 | Stone et al. | 2/2.5 |

*Primary Examiner*—Michael A. Neas
*Assistant Examiner*—Gary L. Welch
*Attorney, Agent, or Firm*—Nawrocki, Rooney & Sivertson, P.A.

[57] ABSTRACT

A garment for use by a patient after surgery for breast removal which alleviates post-operative pain and discomfort and facilitates normal activities during the recovery period. A padded vest-like garment is adapted for applying comforting pressure to the sites of removal of breast and other tissues and for holding pain relieving packages. A detachable arm support provides further comfort in a similar manner.

17 Claims, 5 Drawing Sheets

Fig. 10
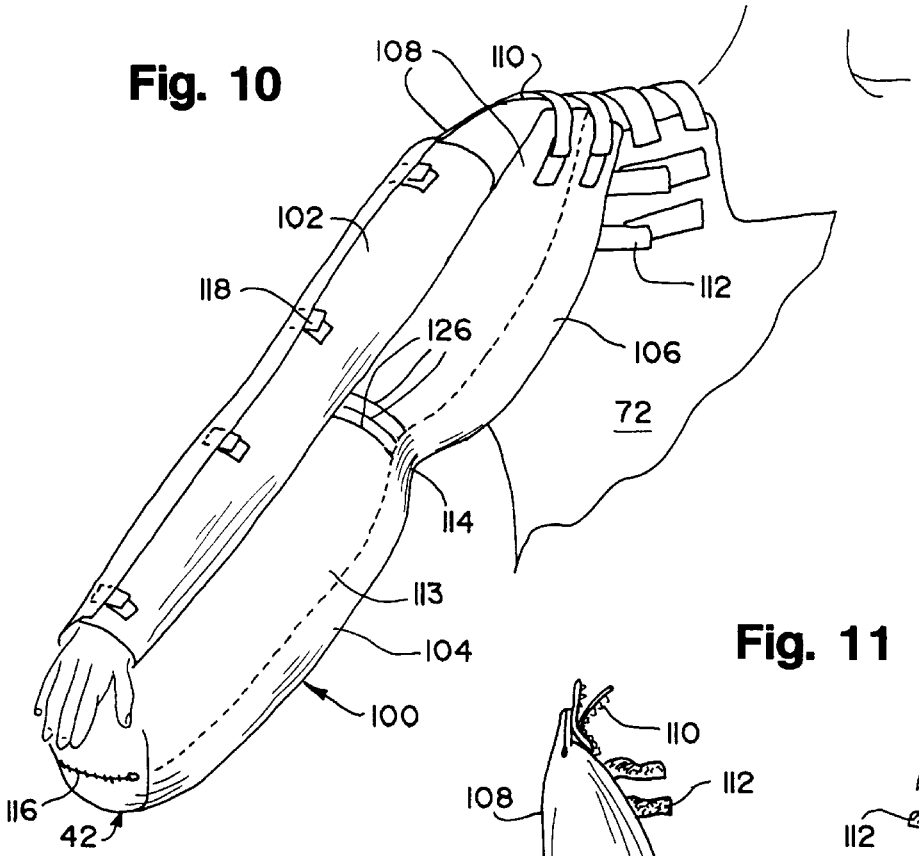
Fig. 11
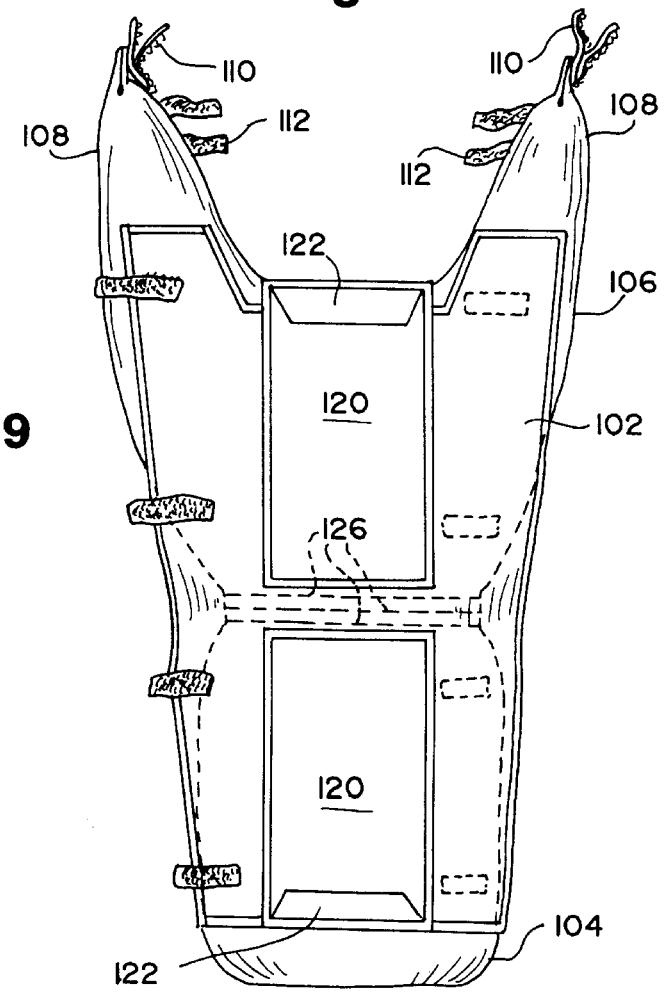
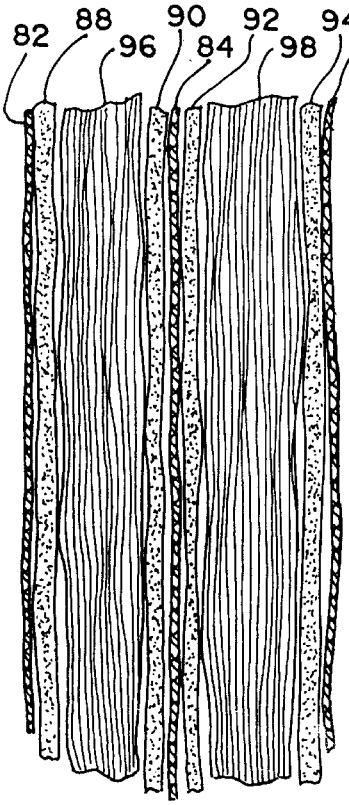
Fig. 9

POST-MASTECTOMY GARMENT

Matter enclosed in heavy brackets [ ] appears in the original patent but forms no part of this reissue specification; matter printed in italics indicates the additions made by reissue.

SUMMARY OF THE INVENTION

The present invention relates to a garment for use by a patient after surgery for breast removal which alleviates post-operative pain and facilitates normal activities during the recovery period.

BACKGROUND OF THE INVENTION

Cancer of the breast is a significant health problem because of the usually fatal results if it is not treated in time to prevent metastatis or spread of the cancer to other parts of the body. Because of the severe consequences, the most prevalent treatment is a radical mastectomy entailing removal of the entire breast including lymphatic vessels and adjacent axillary lymph nodes under the arm, through which, if not removed, the cancerous cells can easily spread throughout the body, and sections of the arm and chest muscles beneath the breast. Less radical treatments may also be used such as a "lumpectomy", where only the tumor and immediately surrounding tissues are excised, or a modified mastectomy, where less surrounding tissues are removed than in a radical mastectomy. Such treatments may present greater risk of recurrence of the cancer. All of these treatments may be combined with post-operative radiation therapy, chemotherapy or hormone treatments to prevent recurrence.

Breast cancer is also known to strike men. However, since the vast majority of victims are women and because the shape and size of a woman's breasts are considered important in many cultures, much of the creative activity designed to benefit post-mastectomy patients has focused on cosmetic aspects. Thus, silicone implants were developed to be used in surgically reconstructed breasts and have become a subject of current controversy as to their safety. Numerous prosthetic garments have been developed to conceal the absence of one or both breasts. One such, among many, is shown in U.S. Pat. No. 4,854,915.

A radical mastectomy, because of the removal of muscle and lymph tissues in areas having large concentrations of nerves, results in severe and long-lasting post-operative pain. Mobility of the adjacent arm is greatly impaired and movement is painful, even during sleep. Sleep is disturbed. Normal functions which are not usually physically demanding, such as steering a car, may be painful due to the problems of resting the impaired arm in a comfortable sustainable position. Without denigrating the contributions of those who have developed post-mastectomy prosthetic devices, it is believed that too little attention has been paid to the development of devices to alleviate the pain associated with a patient's efforts to function normally after undergoing a mastectomy.

However, one such device is shown in U.S. Pat. No. 3,173,420, issued Mar. 16, 1965, to Mazzoni and Taylor. That patent discloses a vest-like garment made of a single sheet of material which is resilient in more than one direction, such as knitted jersey, constructed for the most part using expansible stitching such as zig-zag machine stitching. The patent also shows the use of pockets over the breast sites to accommodate a breast which has not been removed or a prosthetic pad to simulate the appearance of a natural breast, as the case may be. The advantage of this disclosure appears to be to minimize discomfort caused by pressure on the skin and particularly on incision sites of non-resilient fabrics and rigid seams between different portions of prior garments The removable pads used are purely cosmetic.

The present invention by contrast focuses on alleviating more than merely the pain arising from skin tenderness. In addition, this invention minimizes pain arising from the subcutaneous aspects of the surgery including internal sutures, removal of internal structures, rearrangement of remaining structures, particularly muscle tissue, and post-operative fluid drainage.

DESCRIPTION OF THE DRAWINGS

FIG. 9 is a cross-section of one embodiment of the padded part embodiment of the body portion shown in FIGS. 3 through 8.

FIG. 10 is a perspective view of the arm portion of the garment and adjacent structure of the body portion.

FIG. 11 is a top plan view of the arm portion shown in FIG. 10 showing the sleeve portion in open position.

DETAILED DESCRIPTION

Popular medical literature has referred to breast removal as a superficial operation, noting that it does not involve the invasion of body cavities as is required for the removal of lungs, kidneys, the gall bladder, or other internal organs. Although technically correct, this characterization tends to minimize the severe effects on the body of a radical mastectomy and the resulting pain, which is generally for greater than that caused by removal of a melanoma or skin cancer.

Figure 1:
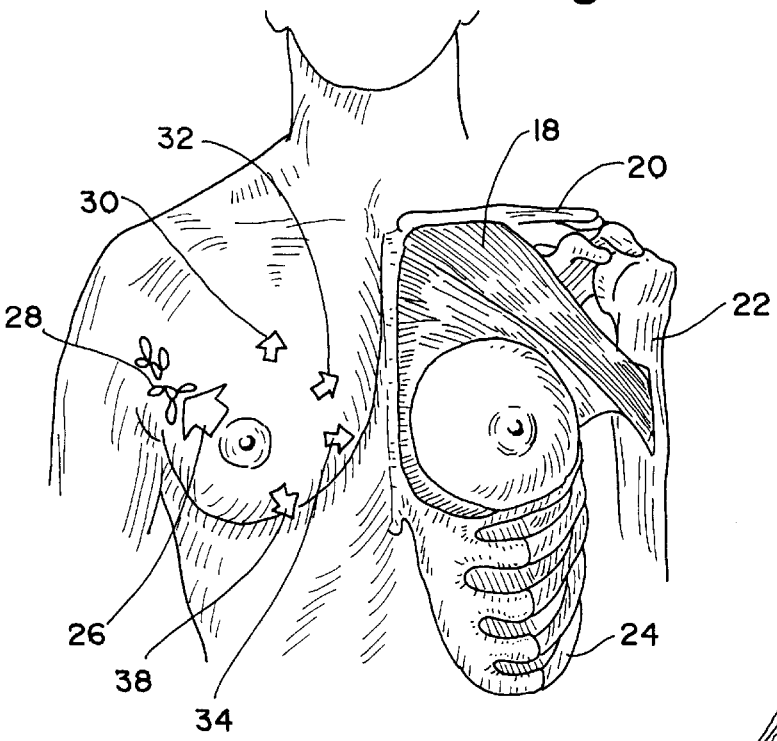
FIG. 1 is a sectional view of a breast and underlying bones and muscles.
Figure 2:
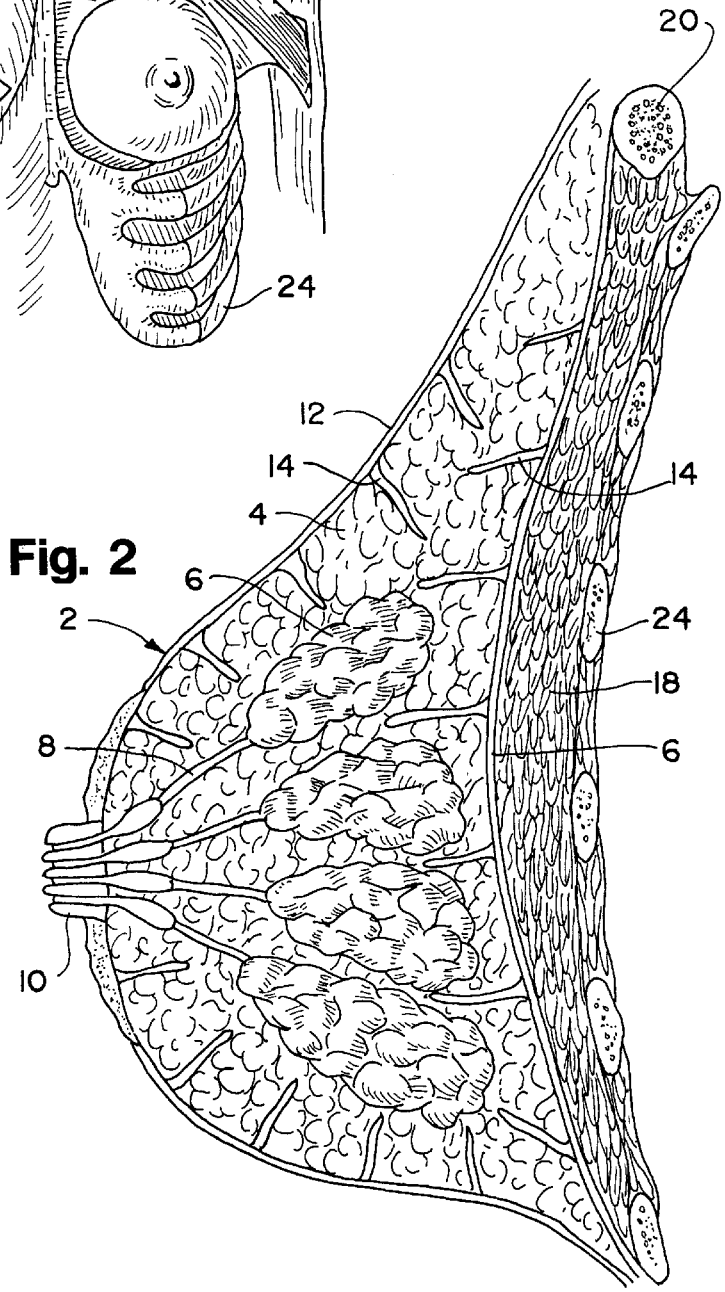
FIG. 2 is a front view of a woman's chest and upper arms with the skin removed on one side to show the underlying tissues.

FIGS. 1 and 2 show the structures which are completely or partially removed in a radical mastectomy. A breast 2 includes fatty superficial fascia 4 within which are glandular lobes 6 leading to lactiferous ducts 8 which conduct milk to the nipple 10. The breast is covered by skin 12 and supported by a plurality of fibrous suspensory ligaments 14 both on the periphery of the breast and extending outward from the deep fascia 16 of the pectoralis major or chest muscle 18. The breast also includes blood vessels and nerves (not shown).

The pectoralis major 18 extends from the clavicle 20 and across the chest to the upper arm 22 and overlies ribs 24.

Most importantly, the breast contains a plethora of lymphatic vessels. Normally these function to drain the fat portion of the milk produced during lactation. However they also are vehicles for the transfer of infection or neoplastic (cancerous) cells to more distant parts of the body. In FIG. 1, arrows are used to show the various directions of lymphatic drainage from the breast. The most significant is arrow 26 leading to the axillary lymph nodes 28 in the armpit which receive the bulk of the drainage. Other drainage paths are upward toward apical nodes indicated by arrow 30, toward parasternal nodes indicates by arrow 32, toward the opposite breast indicated by arrow 34 and toward the abdomen indicated by arrow 38.

From this description of body structure and function, the high degree of danger of cancer of the breast spreading to the rest of the body can be appreciated, as well as the advisability of the radical mastectomy procedure which includes, as a precaution, removal of the axillary lymph nodes and certain muscle tissues. But it can also be appreciated that the post-operative pain will not be superficial or short lived and that the patient must deal with this before considering cosmetic matters, however important they may be from the psychological standpoint.

Referring now to FIGS. 3 through 11, the garment comprises a body portion 40 and an arm portion 42 which are detachable from and attachable to one another so that they may be worn and used separately or in combination with one another, depending on the needs of the user.

One common feature of both the body portion and the arm portion is that they are both covered by a fabric which is flexible and soft to the touch of the skin buy which is not stretchable in one or more directions, so that the shape and fit of the garment is stable. The fabric desirably should be natural to avoid allergic reactions particularly for patients whose immune systems may not be functioning normally as a result of post-operative therapy. The fabric also desirably should allow the passage of moisture and air to and from the skin of the user. Another desirable characteristic is freedom from dyes or other chemical treatments which could cause patient reactions. Still other desirable characteristics are a high thread count to minimize or prevent any leakage of the filler materials described below, strength, and washability. A 100% cotton downproof white ticking material is preferred.

Such a material comprises both the outer layer of the arm portion and the inside and outside layers of the body portion. Both portions include filling or padding material in structures which are described below. Much of the padding material is 100% cotton batting. However, in some portions where absorption of shock is more significant, polyester batting may be more desirable. The use of polyester is desirably minimized because it may create unpleasant warmth for the user. Alternating layers of cotton and polyester can combine the best features of each material.

Figure 3:
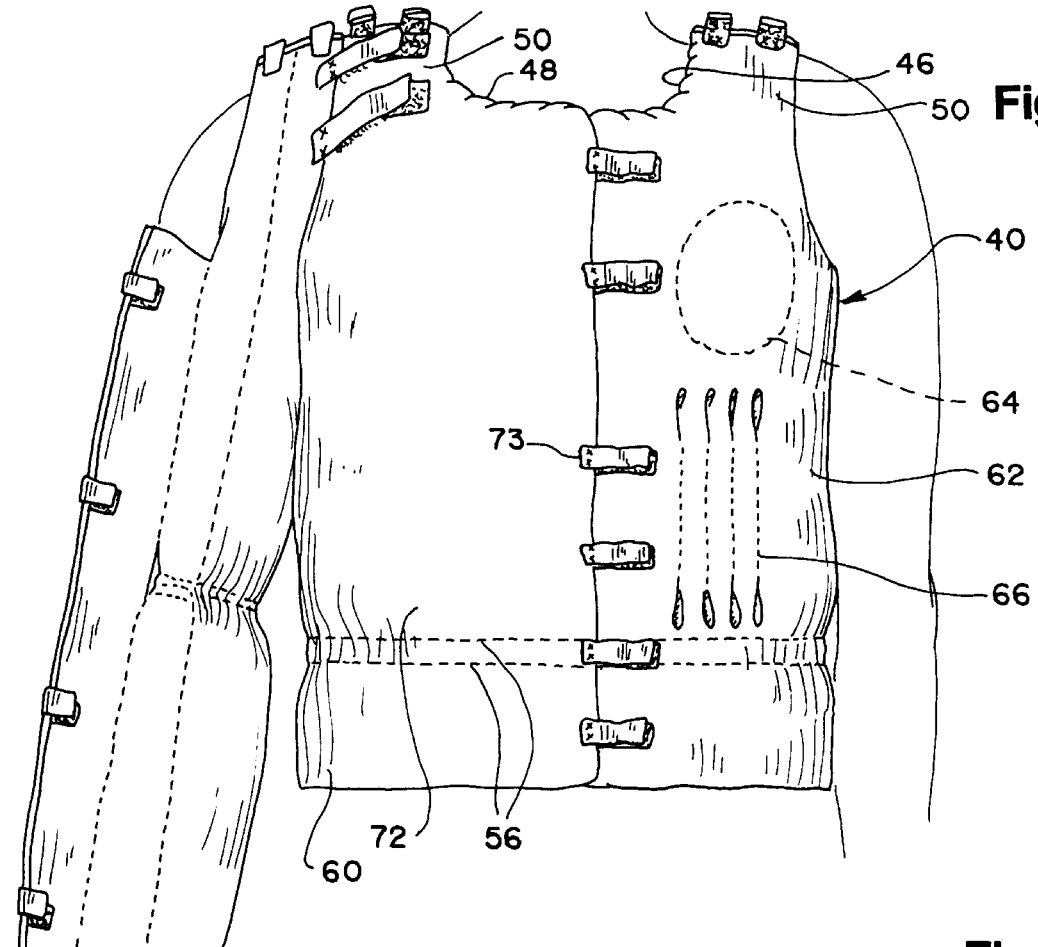
FIG. 3 is a front view of a patient wearing the complete garment.
Figure 4:
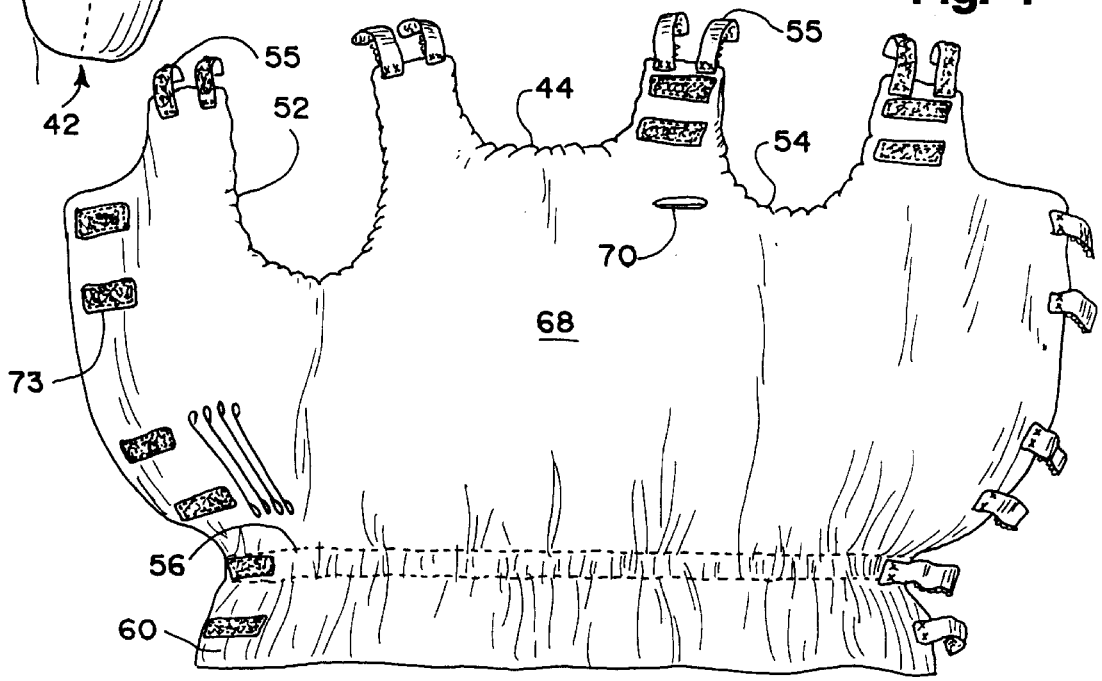
FIG. 4 is a back outside view of the body portion of the garment shown in FIG. 3.
Figure 5:
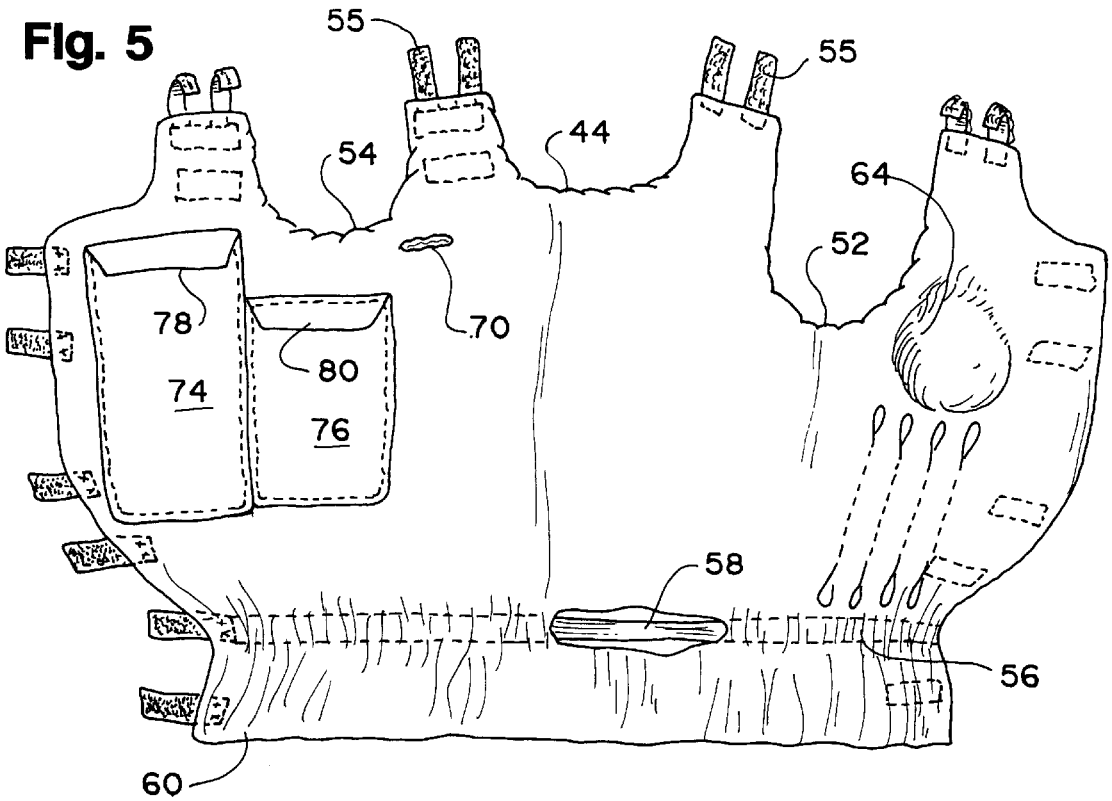
FIG. 5 is a plan inside view of the body portion of the garment shown in FIG. 3 showing the side adjacent the patient's body.
Figure 6:
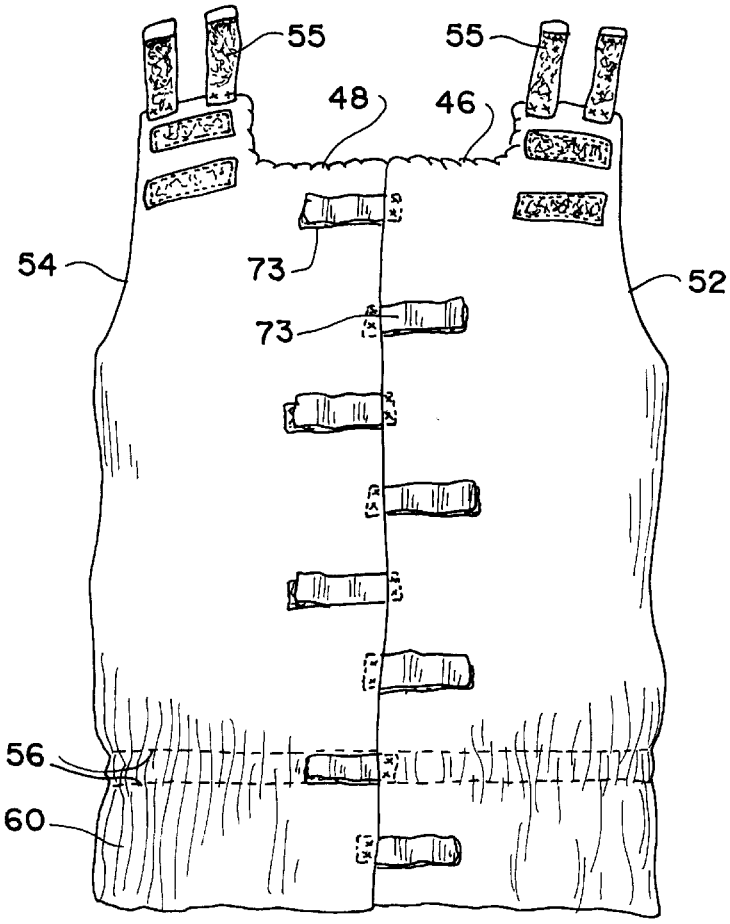
FIG. 6 is a front view of the body portion of the garment similar to that shown in FIG. 3 modified for use by a patient who has had a double mastectomy.
Figure 7:
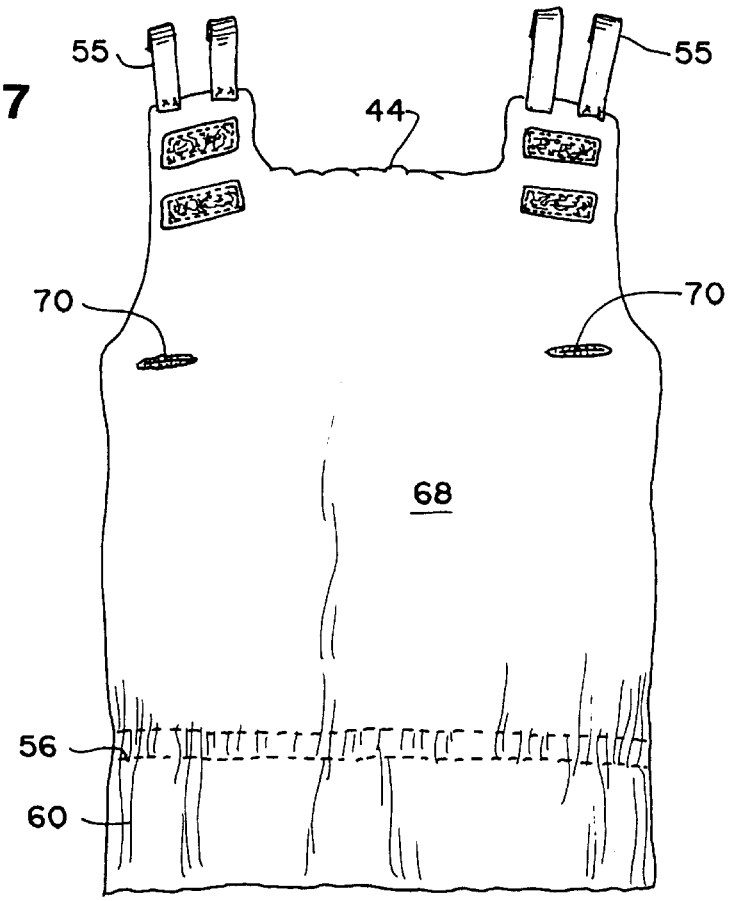
FIG. 7 is a back outside view of the body portion of the garment shown in FIG. 6.
Figure 8:
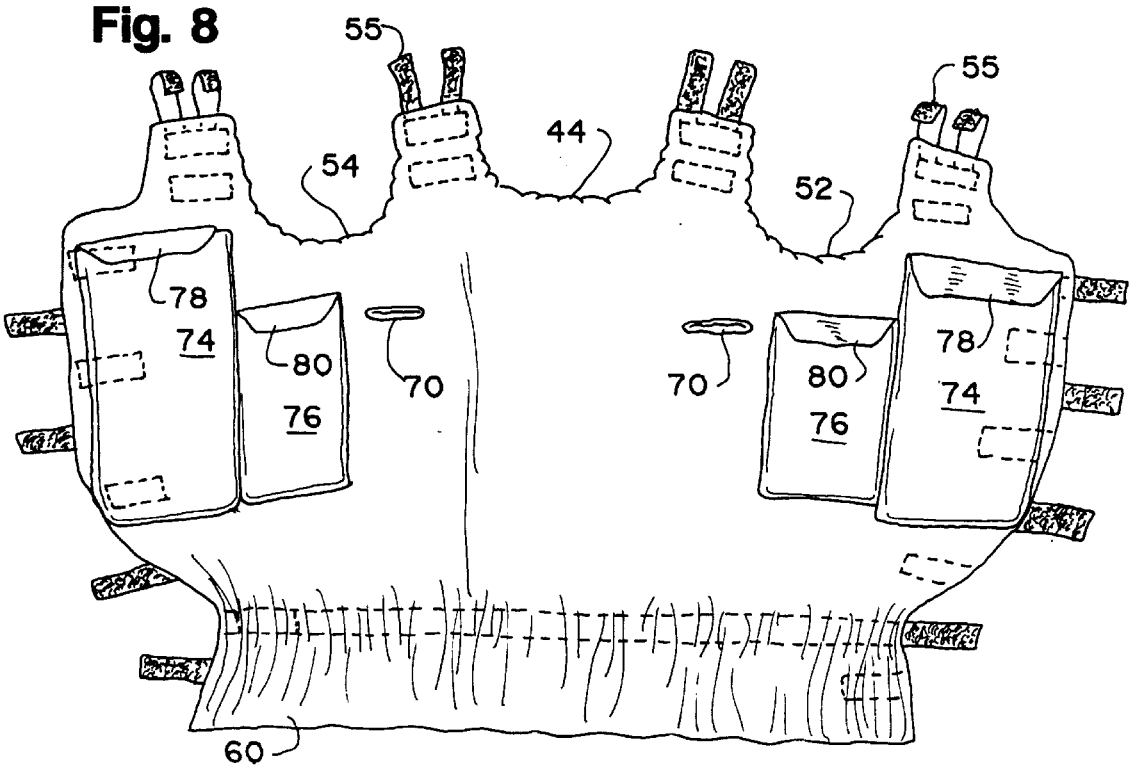
FIG. 8 is a plan inside view of the body portion of the garment shown in FIG. 6.

The body portion 40 of the garment generally resembles a vest in that it is adapted to encircle the upper body portion, closes over the patient's chest and lacks integral sleeves. As illustrated in FIGS. 3, 4 and 5 and as first described herein, the garment is adapted for a patient who has undergone a mastectomy of the right breast. The invention is, of course, not limited to this situation. Changes to adapt the garment to a left mastectomy fall within the scope of the invention. FIGS. 6, 7 and 8 illustrate the variations desirable in the case of a double mastectomy and identical reference numerals are used in all of these figures. The inner and outer covering layers of the body portion are each made of a single piece of material thus minimizing seams and enhancing comfort.

The body portion 40 includes a curved back neck opening 44, and a curved front neck opening in two portions 46 and 48. The two neck openings are each adjacent to two upwardly extending shoulder pieces 50. Between the front and rear right pair of shoulder pieces and between the front and rear left pair of shoulder pieces are downwardly extending arm openings 52 and 54. The shoulder pieces are fastened to one another when the user dons the garment by adjustable straps. Mating Velcro® pieces 55 are presently the most practical form of fastener because of their continuously, infinitely variable adjustability and because they can easily be operated with one hand. This is particularly significant for a post-mastectomy patient who usually finds arm movement difficult and painful.

The arm opening 52 shown in FIGS. 4 and 5 is substantially larger than arm opening 54. As illustrated, opening 52 is the arm opening which is not adjacent the removed breast. Therefore it is larger to accommodate normal arm movement. By contrast, arm opening 54 is much smaller so that the garment extends to the very armpit.

Two rows of stitching 56 provide gathers which enclose an elastic band or draw cord 58 extending parallel to the lower edge of the body portion. This location is approximately at the waistline of the wearer to provide gathering for a tight fit at the waist. Below the gathers, the body portion extends for a suitable distance to provide a section 60 of material which may be tucked inside the waist of a skirt, slacks, or other lower body garment. This section does not include any padding.

Adjacent arm opening 52, the front part 62 of the body portion is lightly padded or unpadded. It may include any conventional breast cup structure 64 to receive the intact breast or none of so desired. Vertical pleats 66 are provided extending from the breast site to the waistband 58 for better fit under the breast.

The back 68 of the body portion is thickly padded with the materials disclosed above. The back portion 68 is provided with an opening 70 below and close to arm opening 54. This opening extends through both the inside and outside layers of the garment and the intermediate padding. Around the opening 70, the inside and outside layers are stitched together to prevent loss of padding. The purpose of the opening is to accommodate the drain tubes and fluid collectors required after a mastectomy.

The front part 72 of the body portion adjacent arm opening 54 is also heavily padded. Heavy padding is also provided under arm opening 54. Front part 72, unlike front part 62, is substantially flat on the inside because it overlies the site of breast removal. Front part 72 is somewhat wider than front part 62 so that it overlaps front part 62. Closure of the body portion of the garment is accomplished by a plurality of infinitely variable fasteners, preferably mating Velcro® pieces 73 which can be operated with one hand. The loose strips are on the front part 72 so that the body portion adjacent the breast removal site can easily be made to fit snugly against the wearer's body, which minimizes pain.

As additional features, the front part 72 of the body portion includes on its inside surface pouches 74 and 76 which, respectively, overlie the site of the removed breast and extend downward from arm opening 54. Both pouches have openings at their upper ends to receive packs of pain alleviating materials such as, for example, hot packs, cold packs, or solid additional padding. Another type of pack which may prove useful is an inflatable pack to increase pressure on the affected area similar to those developed in recent years for athletic shoes, skates and ball gloves with customized fit. Either or both pouches may be provided with flaps 78 and 80 to assure retention of the inserted packs.

FIGS. 6, 7 and 8 illustrate the body portion of the garment adapted for a patient with a double mastectomy. For such cases, both front portions are very thickly padded and heavily padded under both arm openings. Drain tube openings and pouches are provided on both sides. Both arm openings are cut high to provide padding directly under the armpit. The front portions in this garment are symmetrical and come to the center of the body. The front closures in these figures are shown with their loose and fastenable ends alternating on opposite sides to permit the wearer to adjust the pressure to be greater on either side as needed.

FIG. 9 shows a cross-section of the padded areas of the body portion 40 in one embodiment. Inside layer 82, central layer 84 and outside layer 86 are of the previously mentioned downproof 100% cotton ticking. Each cotton ticking layer is adjacent to a layer of cotton batting 88, 90, 92 and 94. Sandwiched between the layers of cotton batting are layers 96 and 98 of polyester batting used for their resiliency and shock absorbing qualities.

The arm portion 42, as shown in detail in FIGS. 10 and 11, includes an arm support 100 and an arm enclosure or sleeve 102. The arm support 100 comprises a lower arm portion 104, an upper arm portion 106, shoulder portions 108, shoulder closure means 110, and body portion attachments 112. The lower arm portion 104, upper arm portion 106 and shoulder portions 108 are constructed of a casing 113 of the comfortable 100% cotton ticking previously described, stuffed with a relatively firm but resilient material commonly used for firm pillows such as cotton or polyester. Since its primary purpose is support of the arm which is an extremity of the human body, the disadvantages of artificial materials as used in the body portion 42 are not as significant for the arm support. The lower arm portion 104 and upper arm portion 106 are demarcated by a neck 114 containing less stuffing material than either the upper or lower support portions. The casing 113 is gathered at the neck between the two portions by an elastic band. Pleats 126 on the top of the casing provide flexibility for allowing the arm to bend. In combination with a lesser adjacent amount of padding in both portions, this provides a means of bending one portion against the other to accommodate natural placement of the arm. The shoulder portions 108 encircle the wearer's shoulder at the upper end of the upper arm portion 106 and are fastened together by continuously variable fasteners preferably mating Velcro® strips which constitute the shoulder closure means 110.

As illustrated, the lower end of the lower arm portion 104 is provided with an opening and closure therefor 116 which may be a zipper or Velcro® strips. The purpose of the opening is to permit insertion of an inflatable device to adjust the volume of the lower portion. When the inflatable device is not present, the volume of the lower portion is much less than when the garment is in use. This provides advantages in packing the garment or in airline travel. In use, the lower arm portion is thicker than the upper arm portion, which provides elevation for the lower arm when the patient is lying down.

One or both of the shoulder portions are provided with body portion attachments 112. As with all other attachment means, Velcro® fasteners at present appear to be the most practical.

The arm enclosure 102 is mounted on the arm support 100 and is designed to enclose the arm and secure it to the arm support. Fastening of opposite edges of the arm enclosure around the arm is also accomplished by adjustable fasteners 118 such as Velcro® strips.

On the side of the arm enclosure 102 adjacent the arm support are pouches 120 with flaps 122 similar to those included in the body portion and similarly adjusted to receive hot or cold packs, solid padding or inflatable packs to relieve pain.

Two arm portions may be provided for a patient who has undergone a double mastectomy.

Both portions of the garment may easily be adjusted to provide a firm, snug, comfortable fit which lessens pain during normal activities and during sleep. The pouches permit the application at all such times of various pain-relieving packs. The pressures applied to the body may also serve to reduce post-operative fluid collection.

Although the invention has been described with respect to certain specific embodiments, numerous variations will be apparent which will fall within the scope of the appended claims.

What is claimed is:

1. A garment for use following surgical breast removal in which a patient has had removed substantially all of the subcutaneous tissue of a least one breast so that the contour of the patient's body at the site of breast removal approximates the contour of the patient's rib cage and also has had removed lymphatic and muscle tissue adjacent the patient's armpit comprising:

a. a body portion for surrounding the patient's upper body including a back portion and two front portions, said front portions being separable from one another along vertical edges to permit placement of said body portion around the patient's upper body, said body portion and front portions having total horizontal dimensions larger than the largest circumference of the patient's upper body so that said vertical edges overlap one another when said body portion is placed around the patient's body, b. said body portion comprising inner and outer layers of soft non-expansible fabric permeable to gases and liquids to provide skin comfort to the patient and resilient padding material disposed between said inner and outer layers to provide resilient pressure on the patient's body, c. a plurality of fastening means vertically spaced along each of said vertical edges, said fastening means each being continuously variable horizontally and independently of one another so that the garment is adjustable for a snug fit around all portions of the upper body of the patient, d. at least one of said padded front portions having a cross-section which is substantially uniform so that said front portion snugly fits and exerts comforting pressure on the site of the removed breast, and e. said body portion including an arm opening adjacent a site of breast removal which fits more snugly against the armpit adjacent a site of breast removal than an arm opening in said body portion that is not adjacent a site of breast removal and said body portion is provided with resilient padding additional to that in a remainder of said body portion to exert comforting pressure on the site of removed lymphatic and muscle tissue.

2. A garment according to claim 1 wherein each of said fastening means is operable by one hand.

3. A garment according to claim 1 including shoulder straps joining said back portion and each of said front portions to further secure the garment on the patient's body.

4. A garment according to claim 3 wherein said shoulder straps include continuously variable fastening means for adjusting the effective length of said straps.

5. A garment according to claim 4 wherein each of said shoulder strap fastening means is operable by one hand.

6. A garment according to claim 1 for use by a patient who has had only a single breast removed wherein said front portion adjacent the intact breast includes a breast cup.

7. A garment according to claim 1 including an opening therethrough for insertion of fluid drain tubes.

8. A garment according to claim 1 including at least one pouch between said inner and outer layers for receiving pain alleviating packages.

9. A garment according to claim 8 wherein a pouch is adjacent a breast removal site.

10. A garment according to claim 8 wherein a pouch is located adjacent to the patient's armpit adjacent to a breast removal site.

11. A garment according to claim 1 further including a padded arm support and a sleeve for receiving a patient's arm.

12. A garment according to claim 11 wherein said arm support includes an upper arm portion and a lower arm portion which are movable relative to one another.

13. A garment according to claim 12 wherein said sleeve has an opening along its entire length and closure means for closing said opening.

14. A garment according to claim 11 including at least one pouch within said sleeve for receiving pain alleviating packages.

15. A garment according to claim 11 wherein said body portion and said arm portion are attachable to and detachable from one another.

*16. A method for making a mastectomy garment comprising:*

*a. providing a tightly fitting vest that fits snugly around at least the chest region of a patient, wherein the tightly fitting vest includes a first arm opening and a second arm opening;*

*b. sizing said first arm opening and said second arm opening such that the tightly fitting vest extends substantially to the armpits of the patient; and*

*c. cutting said second arm opening to be larger than said first arm opening.*

*17. A garment comprising:*

*a. a body portion for surrounding a portion of a person's upper body including a first chest area and a second chest area; and*

*b. fitting means incorporated into said body portion providing more force against said first chest area than said second chest area, said fitting means including a first arm opening and a second arm opening wherein the first arm opening is smaller than the second arm opening, and the body portion surrounding the first and second arm openings being relatively non-stretchable in at least one direction.*

* * * * *